United States Patent
Lindsay et al.

(10) Patent No.: US 8,923,307 B2
(45) Date of Patent: Dec. 30, 2014

(54) METHOD AND SYSTEM FOR AN INTEGRATED DUAL PORT GIGABIT ETHERNET CONTROLLER CHIP

(75) Inventors: Steven B. Lindsay, Mission Viejo, CA (US); Gary Alvstad, Tustin, CA (US)

(73) Assignee: Broadcom Corporation, Irvine, CA (US)

(*) Notice: Subject to any disclaimer, the term of this patent is extended or adjusted under 35 U.S.C. 154(b) by 1881 days.

(21) Appl. No.: 10/887,123

(22) Filed: Jul. 8, 2004

(65) Prior Publication Data

US 2005/0013317 A1   Jan. 20, 2005

Related U.S. Application Data

(60) Provisional application No. 60/487,007, filed on Jul. 14, 2003.

(51) Int. Cl.
*H04L 12/28* (2006.01)
(52) U.S. Cl.
USPC ............................ 370/401; 370/389; 370/392
(58) Field of Classification Search
USPC ......... 370/389, 392, 393, 400, 421, 423, 428, 370/902, 910; 710/309
See application file for complete search history.

(56) References Cited

U.S. PATENT DOCUMENTS

| | | | | |
|---|---|---|---|---|
| 4,858,173 A * | 8/1989 | Stewart et al. | 710/244 |
| 5,852,609 A * | 12/1998 | Adams et al. | 370/465 |
| 5,974,518 A * | 10/1999 | Nogradi | 711/173 |
| 6,275,499 B1 * | 8/2001 | Wynn et al. | 370/438 |
| 6,321,340 B1 * | 11/2001 | Shin et al. | 713/310 |
| 6,453,360 B1 * | 9/2002 | Muller et al. | 709/250 |
| 6,539,488 B1 * | 3/2003 | Tota et al. | 713/400 |
| 6,556,580 B1 * | 4/2003 | Wang et al. | 370/412 |
| 6,564,161 B1 * | 5/2003 | Lin et al. | 702/117 |
| 6,732,249 B1 * | 5/2004 | Pickreign et al. | 711/202 |
| 6,901,072 B1 * | 5/2005 | Wong | 370/389 |
| 7,035,277 B1 * | 4/2006 | Batcher | 370/447 |
| 7,239,642 B1 * | 7/2007 | Chinn et al. | 370/401 |
| 7,251,249 B2 * | 7/2007 | Nanduri et al. | 370/429 |
| 2004/0062246 A1 * | 4/2004 | Boucher et al. | 370/392 |
| 2004/0193303 A1 * | 9/2004 | Fore et al. | 700/126 |
| 2005/0089027 A1 * | 4/2005 | Colton | 370/380 |
| 2005/0097278 A1 * | 5/2005 | Hsu et al. | 711/129 |
| 2007/0005334 A1 * | 1/2007 | Salmonsen | 703/26 |
| 2007/0016704 A1 * | 1/2007 | Harari et al. | 710/68 |
| 2007/0153822 A1 * | 7/2007 | Wang | 370/445 |
| 2007/0258475 A1 * | 11/2007 | Chinn et al. | 370/401 |
| 2009/0092147 A1 * | 4/2009 | Arita et al. | 370/431 |
| 2010/0135289 A1 * | 6/2010 | Bowes | 370/389 |

* cited by examiner

*Primary Examiner* — Phirin Sam
(74) *Attorney, Agent, or Firm* — Oblon, Spivak, McClelland, Maier & Neustadt, L.L.P.

(57) ABSTRACT

Aspects of the invention may include a dual port Ethernet controller having a bus interface, a first Ethernet controller coupled to the bus interface such as a PCI bus interface and a second Ethernet controller coupled to the bus interface. The first Ethernet controller, second Ethernet controller and bus interface are integrated within a single chip. The dual port Ethernet controller may also include an arbiter, which is coupled to the first Ethernet controller, the second Ethernet controller and the bus interface. A plurality of shared resources may be coupled to one or more of the first Ethernet controller, the second Ethernet controller and the arbiter. The shared resources may include, but is not limited to, a non-volatile memory 304 and a general purpose input/out interface.

24 Claims, 6 Drawing Sheets

FIG. 6

METHOD AND SYSTEM FOR AN INTEGRATED DUAL PORT GIGABIT ETHERNET CONTROLLER CHIP

CROSS-REFERENCE TO RELATED APPLICATIONS/INCORPORATION BY REFERENCE

This application makes reference to, and/or claims priority to and/or claims the benefit of U.S. Patent Application Ser. No. 60/487,007, filed Jul. 14, 2003.

This application also makes reference to:
U.S. patent application Ser. No. 10/887,515, filed Jul. 8, 2004.

The above stated application is incorporated herein by reference in its entirety.

FIELD OF THE INVENTION

Certain embodiments of the invention relate generally to high speed networking hardware. More specifically, certain embodiments of the invention relate to a method and system for an integrated dual port gigabit Ethernet controller chip.

BACKGROUND OF THE INVENTION

High-speed digital communication networks over copper and optical fiber are used in many network communication and digital storage applications. Ethernet and Fiber Channel are two widely used communication protocols, which continue to evolve in response to increasing demands for higher bandwidth in digital communication systems.

The Ethernet protocol may provide collision detection and carrier sensing in the physical layer. The physical layer, layer 1, is responsible for handling all electrical, optical, opto-electrical and mechanical requirements for interfacing to the communication media. Notably, the physical layer may facilitate the transfer of electrical signals representing an information bitstream. The physical layer may also provide services such as, encoding, decoding, synchronization, clock data recovery, and transmission and reception of bit streams.

As the demand for higher data rates and bandwidth continues to increase, equipment vendors are continuously being forced to employ new design techniques for manufacturing network layer 1 equipment capable of handling these increased data rates. Chip real estate and printed circuit board (PCB) real estate is generally extremely expensive. Accordingly, the use of available chip and PCB real estate is therefore a critical fabrication consideration when designing chips and/or circuit boards. Particularly in high speed applications operating at high frequencies, a high device count and pin count may result in designs that are susceptible to interference. Notably, high device and pin counts may significantly increase chip real estate and accordingly, significantly increase implementation cost.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for on-chip processing of network data. On-chip processing of network data may include receiving data by a first Ethernet controller integrated within a chip and receiving data by a second Ethernet controller integrated within the same chip. An arbitrating scheme may be utilized to arbitrate which one of the first Ethernet controller and the second Ethernet controller may transfer data over a single bus interface integrated within the same chip. A successful arbitration for the first Ethernet controller or the second controller may be acknowledged. If the first Ethernet controller receives the acknowledgement of the successful arbitration, the received data may be transferred from the first Ethernet controller to the integrated single bus interface. If the second Ethernet controller receives the acknowledgement of the successful arbitration, the received data may be transferred from the second Ethernet controller to the integrated single bus interface. The method may also include tagging the data received from the first Ethernet controller with a first unique identifier and tagging the data received from the second Ethernet controller with a second unique identifier.

Data may be received from at least one device external to the chip and coupled to the integrated single bus interface. A determination may be made as to which one of the first Ethernet controller and the second Ethernet controller should receive the received data for processing. The determining may further include determining or identifying a first unique identifier identifying the received data to be processed by the first Ethernet controller. Additionally, a second unique identifier identifying the received data to be processed by the second Ethernet controller may be determined. The received data may be transferred from the single integrated bus interface to the first Ethernet controller and/or the second Ethernet controller. The received data transferred to the first Ethernet controller may be independently processed by the first Ethernet controller. Similarly, the received data transferred to the second Ethernet controller may be independently processed by second Ethernet controller.

Another embodiment of the invention provides a dual port Ethernet controller. The dual port Ethernet controller may include a bus interface, a first Ethernet controller coupled to the bus interface and a second Ethernet controller coupled to the bus interface. The first Ethernet controller, second Ethernet controller and bus interface may all be integrated within a single chip. The integrated bus interface may be a PCI bus interface although the invention is not limited in this regard. The dual port Ethernet controller may also include an arbiter coupled to the first Ethernet controller, the second Ethernet controller and the bus interface. A plurality of shared resources may be coupled to one or more of the first Ethernet controller, the second Ethernet controller and the arbiter. The shared resources may include, but are not limited to, a non-volatile memory and a general purpose input/out interface. The non-volatile memory may include at least one of an EEPROM, a Flash memory, a SMBus interface and a serial programming interface (SPI). The general purpose input/output interface may include at least one general purpose input/out pin that may be utilized by at least the first Ethernet controller and the second Ethernet controller.

At least one of the first Ethernet controller and the second Ethernet controller may include an Ethernet transceiver, a MAC controller coupled to the Ethernet transceiver, a DMA controller coupled to the MAC controller and/or the arbiter, a memory coupled to the MAC controller, a transmit CPU coupled to the MAC controller and/or the memory, a receive CPU coupled to at least one of the MAC controller and the memory, and at least one control and status register coupled to one or more of the bus interface, the Ethernet transceiver, the MAC controller, the DMA controller, the memory, the transmit CPU and the receive CPU. The control and status register may include a bus interface register, a status register and a control register. The control and status register may also include at least one MII interface register.

The dual port Ethernet controller may include at least one of a clock generator and a phase lock loop, which is integrated within the chip and coupled to at least one of the bus interface block, the first Ethernet controller and the second Ethernet controller. A LED interface integrated within the chip may be coupled to the bus interface, the first Ethernet controller and/or the second Ethernet controller. At least one debug interface may be integrated within the chip and coupled to the bus interface, the first Ethernet controller and/or the second Ethernet controller. The debug interface may be a JTAG or other suitable interface.

These and other advantages, aspects and novel features of the present invention, as well as details of an illustrated embodiment thereof, will be more fully understood from the following description and drawings.

DETAILED DESCRIPTION OF THE INVENTION

An integrated dual port gigabit Ethernet controller chip combines two IEEE 802.3 compliant media access controllers (MACS) with two 10/100/1000 Ethernet transceivers or PHYs, a shared bus interface such as a PCI or PCI-X bus interface, an on-chip buffer memory, all of which are integrated within a single, two function PCI bridge-less chip. In order to provide very low power consumption, the integrated dual port gigabit Ethernet controller chip device may be fabricated in low voltage 1.2v CMOS process. Accordingly, the integrated dual port gigabit Ethernet controller chip may be utilized, particularly in high density server applications where, for example, real estate is a premium.

The integrated dual port gigabit Ethernet controller chip may be adapted to perform all physical layer functions for 1000 BASE-T, 100 BASE-T and 10 BASE-T on standard Category 5 Unshielded Twisted Pair (UTP) cable. The chip utilizes Digital Signal Processing (DSP) technology to provide a highly integrated solution by combining digital adaptive equalizers, Analog to Digital Converters (ADCs), PLLs, line drivers, echo cancellers, crosstalk cancellers, and all other required support circuitry in a single chip. Two full featured MACs provide full and half duplex modes at various operating speeds.

In an embodiment of the invention, the integrated dual port gigabit Ethernet controller chip may include a single PCI v2.2/PCI-X v1.0 bus interface, although the chip functions as if there are two logical software interfaces. Interrupts may be handled by interrupt interfaces within the PCI interface. Each MAC controller may be adapted to have its own PCI configuration space, which may be individually managed via an internal MII control. Individual MAC on-chip memory may provide packet buffering for increased performance and load balancing. Each MAC function may include dual transmit and receive on-chip processors which may be configured to execute custom frame or packet processing features.

The integrated dual port gigabit Ethernet controller chip is a single-chip high-performance multi-speed dual port Ethernet LAN controller, which may be ideally suited for network interface cards (NICs) or LAN on motherboard (LOM) applications. The controller may include two standard IEEE 802.3 Ethernet MACs that can operate in either full-duplex or half-duplex mode. The device may connect directly to a host using, for example, the PCI or PCI-X bus interface. At least two powerful DMA engines may be adapted to maximize system bus throughput and minimize CPU overhead. At least two on-chip buffer memories are provided for further enhanced system performance. The integrated dual port gigabit Ethernet controller chip may utilize a bridge-less arbitration architecture, which may be utilized to control data flow between two independent memory-mapped and PCI configurable PCI functions.

In another aspect of the invention, although state machine logic may be provided for at least some controller operations, the device also incorporates at least two RISC processors for each PCI function. The two RISC processors may be utilized to greatly enhance the state machine logic. These CPUs may be adapted to provide advanced filtering and traffic classification as well as support for computation intensive TCP/IP operations. A firmware solution, for example, may also be provided for a full ASF feature set via a SMBUS interface.

Certain embodiments of the invention provide a method and system for on-chip processing of network data. On-chip processing of network data may include receiving data by a first Ethernet controller integrated within a chip and receiving data by a second Ethernet controller integrated within the same chip. An arbitrating scheme may be utilized to arbitrate which one of the first and the second Ethernet controllers may transfer data over a single bus interface integrated within the same chip. A successful arbitration won by the first Ethernet controller or the second controller may be acknowledged. If the first Ethernet controller receives the acknowledgement of the successful arbitration, the received data may be transferred from the first Ethernet controller to the integrated single bus interface. If the second Ethernet controller receives the acknowledgement of the successful arbitration, the received data may be transferred from the second Ethernet controller to the integrated single bus interface. The method may also include tagging the data received from the first Ethernet controller with a first unique identifier and tagging the data received from the second Ethernet controller with a second unique identifier.

Data may be received from at least one device external to the chip and coupled to the integrated single bus interface. A determination may be made as to which one of the first Ethernet controller and the second Ethernet controller should receive the received data for processing. The determining may further include identifying a first unique identifier identifying the received data to be processed by the first Ethernet controller. Additionally, a second unique identifier identifying the received data to be processed by second Ethernet controller may be determined. The received data may be transferred from the single integrated bus interface to the first Ethernet controller and/or the second Ethernet controller. The received data transferred to the first Ethernet controller may be independently processed by the first Ethernet controller. Similarly, the received data transferred to the second Ethernet controller may be independently processed by second Ethernet controller.

Figure 1:
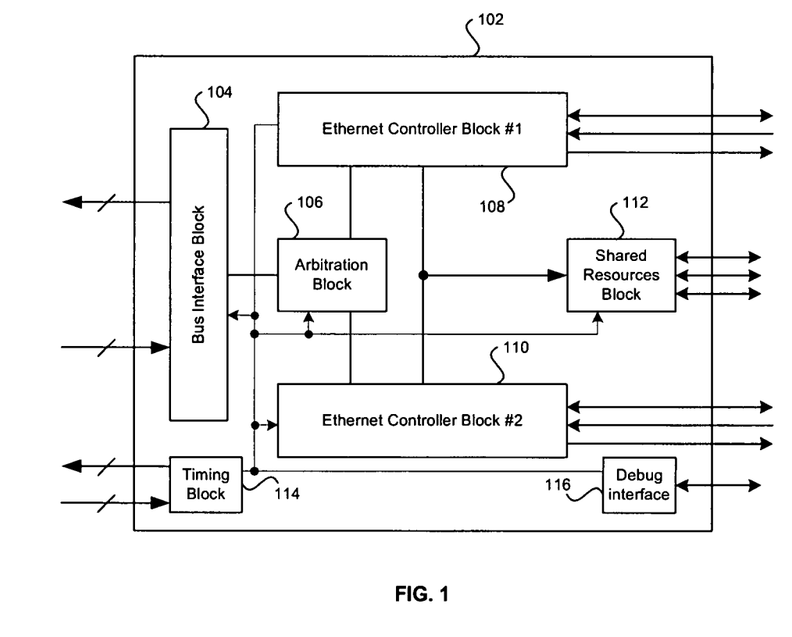
FIG. 1 is a block diagram of an exemplary integrated dual port gigabit Ethernet controller chip in accordance with an embodiment of the invention.

FIG. 1 is a block diagram of an exemplary integrated dual port gigabit Ethernet controller chip in accordance with an embodiment of the invention. Referring to FIG. 1, there is shown a bus interface block 104, an arbitration block 106, a first Ethernet controller block 108, a second Ethernet controller block 110, a shared resources block 112, a timing block 114 and a debug interface block 116. The bus interface block 104, the arbitration block 106, the first and second Ethernet controller blocks 108, 110, the shared resources block 112, the timing block 114 and the debug interface block 116 may all be integrated within chip 102.

The bus interface block 104 may be any suitable bus interface block that may be interfaced to a corresponding bus. The bus interface block 104 may be, for example, a PCI or PCI-X bus interface block. The bus interface block 104 may be coupled to the arbitration block 106.

The arbitration block 106 may be any arbiter, which may include suitable logic and/or software that may be adapted to arbitrate resource access by the first Ethernet controller block 108 and the second Ethernet controller block 110. In this regard, the arbiter 106 may control access to the shared resources block 112 and the bus interface block 104. The arbitration block 106 may provide a bridgeless arbitration function that may be adapted to control dataflow between two independent Ethernet controller functions. Each of the independent Ethernet controller functions corresponds to one of the Ethernet controller blocks 108, 110. In a case where the bus interface block is a PCI interface block, then the arbiter may be configured to control dataflow between two independent PCI functions. A first PCI function may correspond with the first Ethernet controller block 108 and a second PCI function may correspond with the second Ethernet controller block 110.

Figure 2:
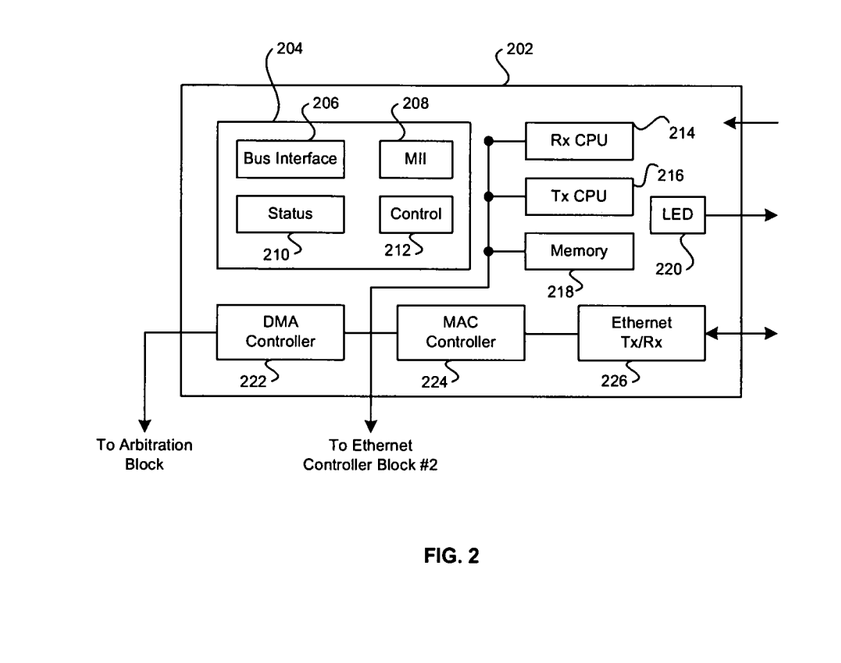
FIG. 2 is a block diagram of an exemplary Ethernet controller block as illustrated in FIG. 1 in accordance with an embodiment of the invention.

The first Ethernet controller block 108 is identical to the second Ethernet control block 110. FIG. 2 is a block diagram of an exemplary Ethernet controller block as illustrated in FIG. 1 in accordance with an embodiment of the invention. Referring to FIG. 2, there is shown a register interface block 204, a receiver central processing unit (Rx CPU) 214, a transmitter central processing unit (Tx CPU) 216, a memory block 218, a LED block 220, a DMA controller 222, a MAC controller 224 and an Ethernet transceiver (Tx/Rx) 226. The register control block 204 may include a plurality of registers that may be utilized for control and/or to provide status information. The register control block 204 may include a bus interface register block 206, a management interface II (MII) register block 208, a status register block 210, and a control register block 212.

The bus interface register block 206 may include suitable logic and/or registers that may be adapted to provide status on various operating aspects of the bus interface block 104. Additionally, the bus interface register block 206 may also be configured to control the operation of the bus interface block 104. In a case where the bus interface block 104 is a PCI bus, then the bus interface register block 206 may be a PCI register block. Accordingly, the PCI register block 206 may be read to provide a status of the PCI interface. Additionally, one or more bit locations in the PCI register block 206 may be set or cleared to control the operation of the PCI interface 104 of FIG. 1.

The management interface II (MII) block 208 may include suitable logic and/or registers that may be adapted to implement the standardized MII protocol. For example, the MII block 208 may include suitable circuitry for controlling standardized MDC and MDIO interface signals. The MII interface may be adapted to provide status on the Ethernet transceivers.

The status register block 210 may include suitable logic an/or software that may be adapted to provide status on any of the components of the integrated dual port gigabit Ethernet controller chip. In this regard, the status register block 210 may provide status on any one or more of the bus interface block 104, the arbitration block 106, the first and second Ethernet controller blocks 108, 110, the shared resources block 112, the timing block 114 and/or the debug interface block 116.

The control register block 212 may include suitable logic an/or software that may be adapted to control the operation of any of the components of the integrated dual port gigabit Ethernet controller chip. In this regard, the control register block 212 may provide status on any one or more of the bus interface block 104, the arbitration block 106, the first and second Ethernet controller blocks 108, 110, the shared resources block 112, the timing block 114 and/or the debug interface block 116 of FIG. 1.

Figure 3A:
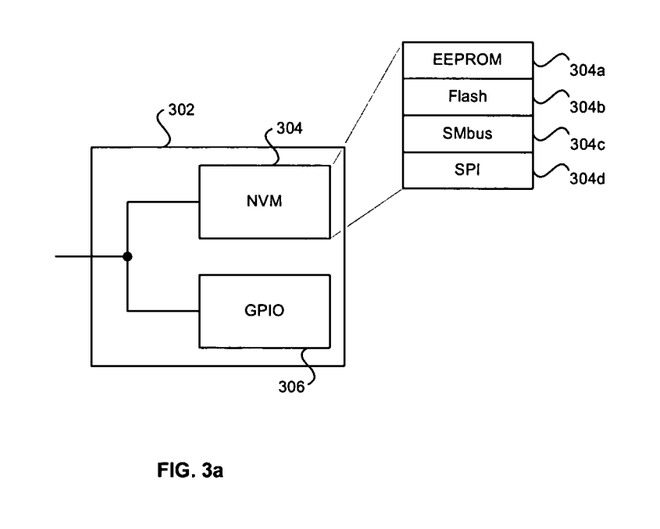
FIG. 3a is a block diagram of the shared resources block of the integrated dual port gigabit Ethernet controller chip in accordance with an embodiment of the invention.

FIG. 3a is a block diagram of the shared resources block of the integrated dual port gigabit Ethernet controller chip in accordance with an embodiment of the invention. Referring to FIG. 3a, the shared resources block 302 may include a non-volatile memory (NVM) block 304 and a general purpose input/output (GPIO) interface block 306. The NVM block 304 may include any one or more of an EEPROM block 304a, a flash block 304b, a SMbus block 304c and a serial programming interface (SPI) block 304d. The NVM block 304 may include one or more semaphore registers that may be adapted to provide access to the NVM block 304 by a plurality of on-chip devices. The NVM block 304 may be controlled through, for example, the status register block 210 and the control register block 212

The EEPROM block 304a may be adapted to store device configuration information. The device configuration information may include but is not limited to, a MAC address for both MACs, a PCI device ID, vital product data (VPD), a boot code image and power up boot code.

The flash block 304b may be adapted to store boot code, which may be utilized during initialization of the integrated dual port gigabit Ethernet controller chip. The SMbus block 304c may include the necessary logic, including registers and timers, and software that may be adapted to provide alert specification forum (ASF) functionality.

The serial programming interface (SPI) block 304d may be adapted to provide a serial connection to a serial device such as an EEPROM or a Flash device. The SPI interface block 304d may be controlled through the status register block 210 and the status of the SPI interface block 304d may be determined by reading the control register block 212.

The general purpose input/output (GPIO) interface block 306 may include a plurality of GPIO pins that may be controlled and monitored through the bus interface or PCI register 206. Each MAC controller may include registers that may be configured to share the GPIO pins in the input/output (GPIO) interface block 306. A contention resolution prevention scheme may be implemented to prevent dual access to the GPIO pins.

Figure 3B:
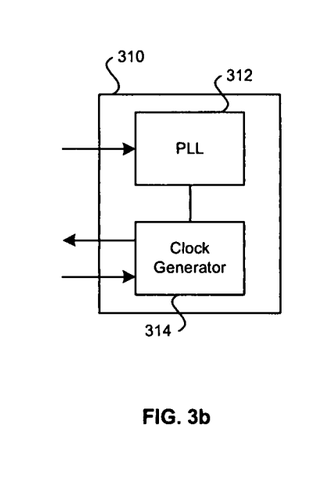
FIG. 3b is a block diagram of the timing block of the integrated dual port gigabit Ethernet controller chip in accordance with an embodiment of the invention.

The timing block 114 may be adapted to provide clock timing and reset signals for the integrated dual port gigabit Ethernet controller chip. FIG. 3b is a block diagram of the timing block of the integrated dual port gigabit Ethernet controller chip in accordance with an embodiment of the invention. Referring to FIG. 3b, there is shown a phase lock loop (PLL) block 312 and a clock generator block 314. The PLL block 312 and the clock generator block 314 may be configured to generate clocks having rates such as 25 MHz, 66 MHz, 125, MHz and 166 MHz, for example. The generated clocks may be supplied to the bus interface block 104, the arbitration block 106, the first and second Ethernet controller blocks 108, 110, the shared resources block 112, the timing block 114 and/or the debug interface block 116. The generated clocks may be utilized for device initialization and for resetting one or more internal or external devices.

The debug interface block 116 may be any suitable debug interface. For example, the debug interface block 116 may be a JTAG block. In this regard, the JTAG block may include pertinent logic and/or software that may be adapted to process JTAG signals such as TCK, TMS, TDI and TDO. The JTAG block may be compliant with the standardized JTAG debug interface.

Each of the Ethernet controller blocks 108, 110 may include a receiver central processing unit (Rx CPU) 214 and a transmitter central processing unit (Tx CPU) 216. The receiver central processing unit 214 may be a RISC processor or other suitable processor, which may be adapted to process channel information. For example, the receiver central processing unit 214 may process information for the MAC controller 224. In one aspect of the invention, the receiver central processing 214 and the transmitter central processing unit 216 may be adapted to run at a clock speed of about 133 MHz and may be adapted to process 32-bit wide data, for example. Either one of the receiver central processing unit 214 or the transmitter central processing unit 216 may be configured to operate as a boot processor for the integrated dual port gigabit Ethernet controller chip. In this regard, the boot processor may contain a ROM, which may be adapted to store bootstrap code.

Each of the receiver central processing unit 214 or the transmitter central processing unit 216 may include a scratch-pad memory, an instruction cache and a data cache. The receiver central processing unit 214 or the transmitter central processing unit 216 may include master/slave interfaces to the integrated dual port gigabit Ethernet controller chip. At least one semaphore register may be configured to permit the Tx CPU 216 and the Rx CPU 214 to share the same hardware resources.

The memory block 218 may include at least one or more of each of the following memory blocks: register block, memory window block, configuration memory block, Rx-CPU scratch pad block, Tx-CPU scratch pad block, Rx-CPU ROM block, Tx-CPU ROM block, mailbox memory block, DMA descriptor block, send ring data block, standard receive and send ring memory block, jumbo receive or send ring memory block, a buffer block, unmapped memory space blocks, reserved memory blocks, and page memory blocks. The various regions of the memory block 218 may be memory mapped. Accordingly, a host processor's memory space may be memory mapped to the memory space of the integrated dual port gigabit Ethernet controller chip. In certain instances, a host processor may be adapted to address various portions of the memory block 218, such as the register block, without windowing. The integrated dual port gigabit Ethernet controller chip may include a base address register (BAR) from which all the components of the memory block 218 may be accessed as an offset to the BAR.

The LED block 220, may be a LED interface which may include a LED control register and one or more LEDs. The LED block 220 may be configurable via the LED control register and may permit the LED block 220 to function in various operational modes. In general, the LED modes may be adapted to permit the LEDs to be driven from either the MAC controller 224 and the LED control register or from the Ethernet transceiver 226. The Ethernet transceiver 226 may also include one or more LED modes that may be utilized to drive the one or more of the LEDs in the LED block 220.

The a DMA controller 222 may be any suitable DMA controller that may be adapted to facilitate the access and transfer of information to and from the devices such as the first Ethernet controller block 108, the second Ethernet controller block 110, the arbitration block 106, the bus interface block 104 and the shared resources block 112.

Figure 4:
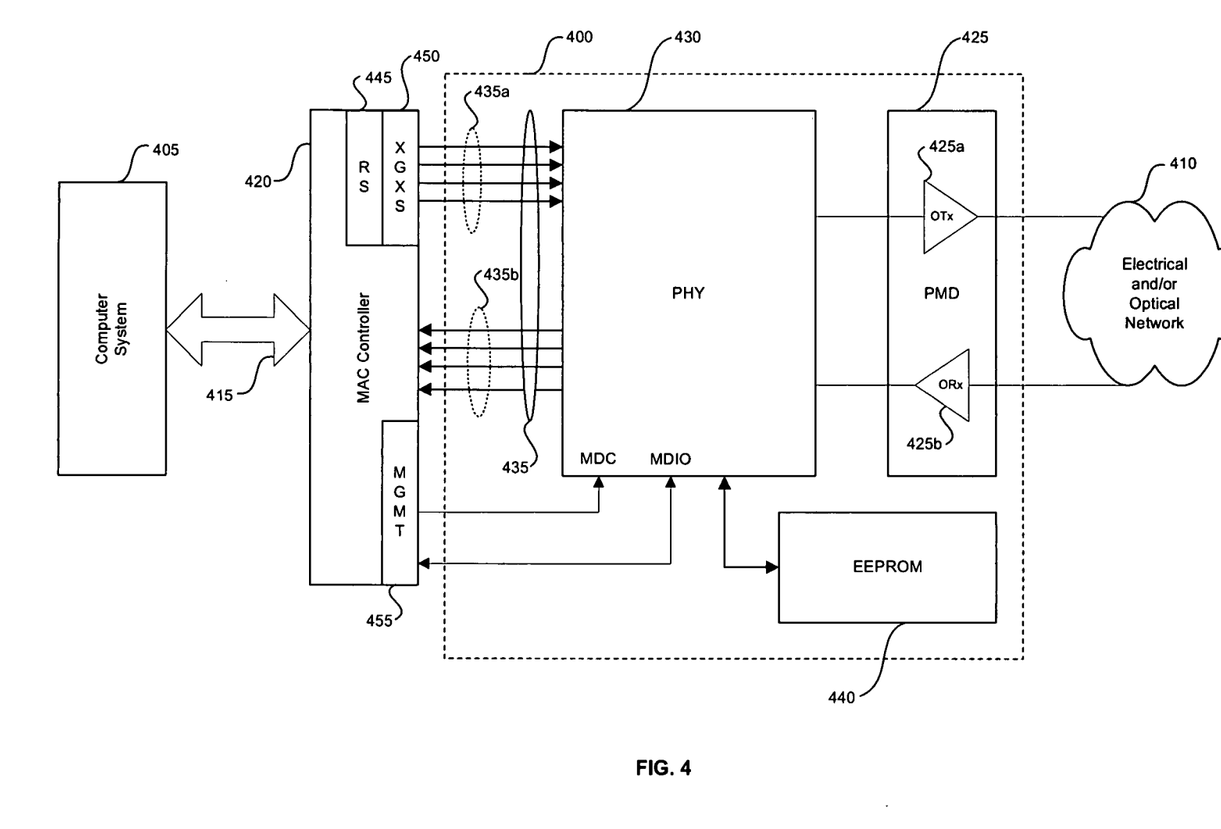
FIG. 4 is a block diagram of an exemplary Ethernet transceiver module that may be coupled to a MAC controller in accordance with an embodiment of the invention.

FIG. 4 is a block diagram of an exemplary Ethernet transceiver module 400 which may be coupled to a MAC controller 420 in accordance with an embodiment of the invention. Referring to FIG. 4, there is illustrated a computer system 405, a medium access control (MAC) controller 420, a bus controller interface 415, an electrical and/or optical network 410, a PHY device 430, an electrically erasable programmable read only memory (EEPROM) 440, a PMD transmitter 425a and a PMD receiver 425b. PMD transmitter 425a and PMD receiver 425b may be integrated into a single PMD 425 such as a chip or IC. Transceiver module 400 may be an integrated device, which may include the PHY device 430, the EEPROM 440, the optical transmitter 425a and the optical receiver 425b. Computer system 405 may interface with MAC controller 420 through bus controller interface 415 and may communicate with the electrical and/or optical network 410 through the transceiver module 400. The bus controller interface 415 may be a PCI or PCI-X interface. Notwithstanding, the invention is not limited in this regard. In a case where the PHY is adapted to interface with a copper plant, the OTx 425a and ORx 425b are not present.

Transceiver module 400 may be configured to communicate, for example, transmit and receive, data between computer system 405 via the controller interface 415 and electrical, optical or electro-optical network 410. The data transmitted and/or received may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1 may provide services to layer 2 and layer 2 may provide services to layer 3. The data link layer, layer 2, may include a MAC layer whose functionality may be handled by a MAC controller 420. In this regard, MAC controller 420 may be configured to implement the well-known IEEE 802.3 Ethernet protocol.

In the embodiment of FIG. 4, the computer system 405 may represent layer 3 and above, the MAC controller 420 may represent layer 2 and above and the transceiver module 400 may represent layer 1. The computer system 405 may be configured to build the five highest functional layers for data packets that are to be transmitted over the optical network 410. Since each layer in the OSI model may provide a service to the immediately higher interfacing layer, the MAC controller 420 may provide the necessary services to the computer system 405 to ensure that packets are suitably formatted and communicated to the transceiver module 400. During transmission, each layer may add its own header to the data passed on from the interfacing layer above it. However, during reception, a compatible device having a similar OSI stack may strip off the headers as the message passes from the lower layers up to the higher layers.

The transceiver module 400 may be configured to handle all the physical layer requirements, which may include, but is not limited to, packetization, data transfer and serialization/deserialization (SERDES) in instances where PHY 430 may be adapted to communicate with an optical network. Transceiver module 400 may operate at a plurality of data rates, which may include 10 Mbps, 100 Mbps and 1 Gbps, for example. Data packets received by the transceiver module 400 from MAC controller 420 may include data and header information for each of the above six functional layers. The transceiver module 400 may be configured to encode data packets that are to be transmitted over the optical medium of the optical network 410. The transceiver module 400 may also be configured to decode data packets received from the electrical or optical network 410.

The MAC controller 420 may interface with the PHY 430 through, for example, an Ethernet attachment unit interface (XAUI) 435. The XAUI 435 may be a low pin count device having a self-clocked bus, which directly evolved from lower data rate protocols. The XAUI may function as an extender interface for a media independent interface (XMGII). In this regard, MAC controller 420 may also include an XGMII extender sublayer (XGXS) interface 450 and a reconciliation sublayer (RS) interface 445. MAC controller 420 may also include an integrated link management (MGMT) interface 455 that may facilitate communication between MAC controller 420 and a management data input/output (MDIO) interface of the PHY 430.

In one aspect of the invention, XAUI 435 may be configured to utilize a plurality of serial data lanes on each of its receive 435a and transmit 435b interfaces to achieve compatible GbE operational speeds. In accordance with the embodiments of FIG. 4, XAUI 435a may be configured to transmit data from the MAC controller 420 to the PHY 430. Additionally, XAUI 135b may be configured to transmit data from the PHY 430 to the MAC controller 420. The PHY 130 may be configured to operate in one or more of a plurality of communication modes, where each communication mode may implement a different communication protocol. These communication modes may include, but are not limited to, GbE, fibre channel and other similar protocols. The PHY 430 may be configured to operate in a particular mode of operation upon initialization or during operation.

The PMD 425 may include at least one PMD transmitter 425a and at least one PMD receiver 425b. In operation, PMD 425 may be configured to receive data from and transmit data to the electrical and/or optical network 410. The PMD transmitter 425a may transmit data originating from the computer system 405 over the electrical and/or optical network 410. The PMD receiver 425b may receive data destined for computer system 405 from the optical network 410 and transmit the data to the computer system 405. The PMD 425 may also be configured to function as an electro-optical interface. In this regard, electrical signals may be received by PMD transmitter 425a and transmitted in a format such as optical signals over the optical network 410. Additionally, optical signals may be received by PMD receiver 425b and transmitted as electrical signals to the computer system 405.

The transceiver module 400 may also include an EEPROM 440. The PHY 430 may be coupled to EEPROM 440 through an interface such as serial interface or bus. EEPROM 440 may be programmed with information, which may include parameters and/or code that may effectuate the operation of the PHY 430. The parameters may include configuration data and the code may include operational code such as software and/or firmware, but the information is not limited in this regard.

Figure 5:
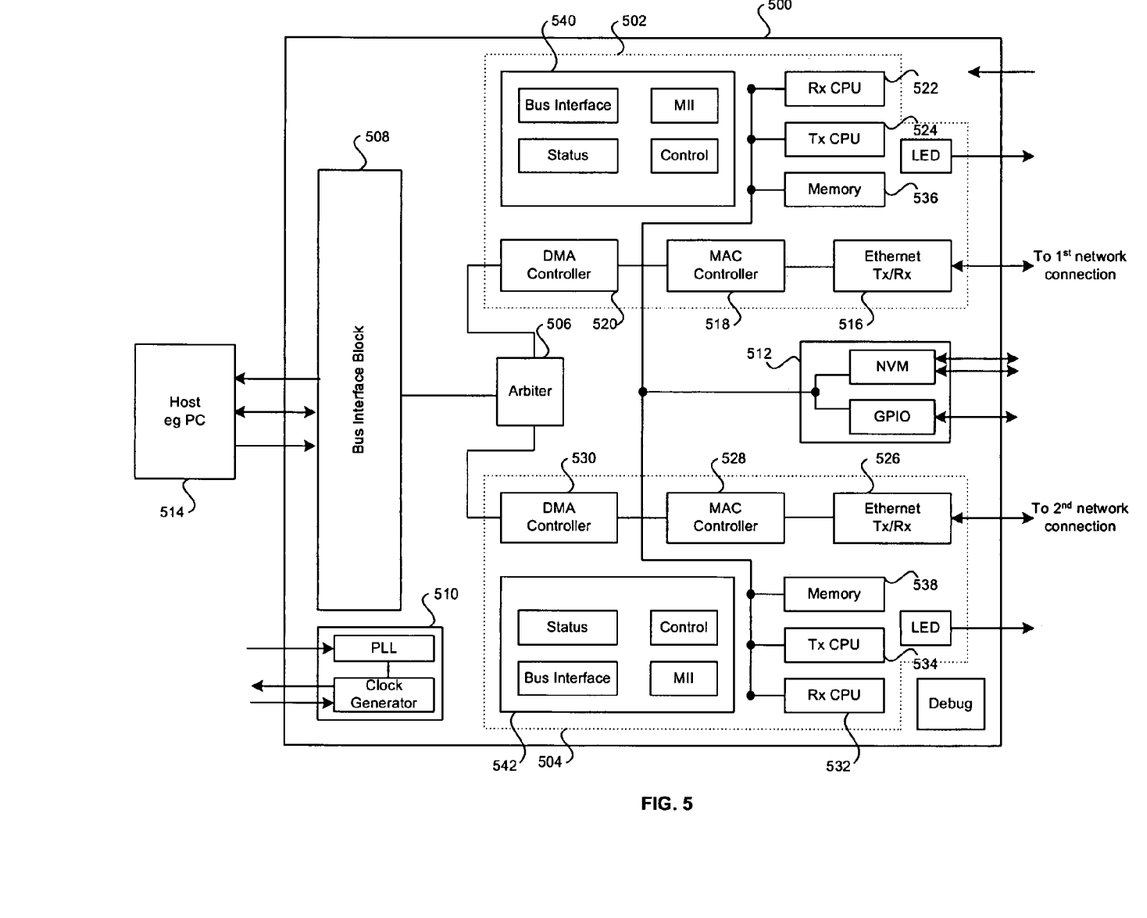
FIG. 5 is a block diagram of an integrated dual port gigabit Ethernet controller chip in accordance with an embodiment of the invention.

FIG. 5 is a block diagram of an integrated dual port gigabit Ethernet controller chip in accordance with an embodiment of the invention. Referring to FIG. 5, there is shown an integrated dual port gigabit Ethernet controller chip 500 coupled to a host system 514. FIG. 5 also illustrates a first Ethernet controller 502, a second Ethernet 504, an arbiter 506, shared resources including an NVM and a GPIO collectively referenced as 512 and a timing block including a PLL and a clock generator collectively referenced as 510. The first Ethernet transceiver block or PHY 516 of the first transceiver 502 may be coupled to a first network connection and the second Ethernet transceiver block or PHY 504 may be coupled to a second network connection.

The first Ethernet controller 502 may include an RxCPU 522, a TxCPU 524, a memory 536, an Ethernet transceiver or PHY 516, a MAC controller 518, and a DMA controller 520. The second Ethernet controller 504 may include an RxCPU 532, a TxCPU 534, a memory 538, an Ethernet transceiver or PHY 526, a MAC controller 528, and a DMA controller 530.

The host system or host may be a personal computer (PC). The integrated dual port gigabit Ethernet controller chip 500 may be integrated within a network card or it may be integrated within a motherboard of the host 514 in a case where the host is a PC. The bus interface block 508 may be adapted to couple the integrated dual port gigabit Ethernet controller chip 500 to the host system 514. In one aspect of the invention, the bus interface block 508 may be a PCI interface that may allow the integrated dual port gigabit Ethernet controller chip 500 to communicate through a PCI bus of the host system 514.

In 10BASE-T mode, Manchester encoding may be performed on a data stream and transmitted on one pair in a twisted pair cable. A multimode transmit DAC may perform pre-equalization for about 100 meters of CAT 3 cable, for example. In 100BASE-TX mode, the integrated dual port gigabit Ethernet controller chip may transmit a continuous data stream on one pair in the twisted pair cable, and receive a continuous data stream on another pair of conductors. The MAC may provide nibble-wide or 4-bit data which may be encoded into 5-bit code-groups and inserted into the transmit data stream. The transmit packet may be encapsulated by replacing the first two preamble nibbles with a start of stream delimiter (SSD) or /J/K codes and appending an end of stream delimiter or /T/R codes to the end of the packet. When the MAC indicates a transmit error, the transmit error code-group (/H) may be sent in place of the corresponding data code-group. The transmitter may repeatedly send the idle code-group between packets. The encoded data stream may be serialized and then scrambled by, for example, a stream cipher block. The scrambled data may then be encoded into MLT3 signal levels.

In 1000BASE-T mode, the integrated dual port gigabit Ethernet controller chip may simultaneously transmit and receive a continuous data stream on all four twisted pairs on the CAT 5 cable on the active port. When a packet is pending transmission from the MAC, byte-wide data from the MAC may be scrambled, trellis encoded into a 4-dimensional code-group, for example, a PAM5 symbol on each of the four twisted pairs, and inserted into the transmit data stream. The transmit packet may be encapsulated by replacing the first two bytes of preamble with a start-of-stream delimiter and appending an end-of-stream delimiter to the end of the packet. When the MAC indicates a transmit error during a packet, a transmit error code-group may be sent in place of the corresponding data code-group. The transmitter may send idle code-groups or carrier extend code-groups between packets. The MAC may use carrier extension to separate packets within a multiple-packet burst. Carrier extend error may be indicated by replacing the transmit data input with a suitable code such as 0x1F during carrier extension.

In 10BASE-T mode, Manchester decoding may be performed on the data stream. Accordingly, a received data stream, following equalization and clock recovery, may be converted from MLT3 to serial NRZ data. The stream cipher block may descramble the NRZ data. The descrambled data may then be deserialized and aligned into, for example, 5-bit code-groups. The 5-bit code-groups may be decoded into 4-bit data nibbles. The start-of-stream delimiter may be replaced with preamble nibbles and the end of stream delimiter and idle codes may be replaced with a suitable code such as 0x00. The decoded data may then be provided to the MAC. When an invalid code-group is detected in the data stream, a receive error may be indicated to the MAC. The receive error signal also asserts when the link fails or when the descrambler loses lock during packet reception.

In 1000BASE-T mode, the receive data stream may pass through a Viterbi decoder and descrambler, for example, and translated back into byte wide data. The start of stream delimiter is replaced with preamble bytes and the end of stream delimiter and idle codes may be replaced with a suitable code such as 0x00. Carrier extend codes may be replaced with a suitable code such as 0x0F or 0x1F. The decoded data may then be provided to the MAC. When an invalid code-group is detected in the data stream, the integrated dual port gigabit Ethernet controller chip may provide an error condition to the MAC. The integrated dual port gigabit Ethernet controller chip may also indicate a receive error when receiving carrier extend code-groups, or when the local receiver status becomes unreliable during packet reception.

Packet data in the received data path of the first Ethernet controller 502 may be received by the Rx CPU 522 for advanced processing. After the Rx CPU 522 has completed advanced processing of the packet data, the Rx CPU 522 may place the processed packet data back in the data path for normal processing and DMA activity between a host and the integrated dual port gigabit Ethernet controller chip. In this regard, received data from the first network connection may be received by the Ethernet transceiver or PHY 516 and processed by the MAC controller 518. The processed data may be buffered in at least a portion of the memory 536, from which it may be transferred to the Rx CPU 522 for advanced packet processing.

Similarly, packet data in the send data path of the first Ethernet controller 502 may be transferred to the Tx CPU 524 for advanced processing. After the Tx CPU 524 has completed advanced processing of the packet data for transmission, the Tx CPU 524 may place the processed packet data back in the data path for normal processing and DMA activity between a host and the integrated dual port gigabit Ethernet controller chip. In this regard, data to be transmitted may be buffered in a portion of the memory 536, from which it may be transferred to the Tx CPU 524 for advanced processing. Data processed by the TX CPU 524 may be buffered in at least a portion of the memory 536 from which it may be transferred to the MAC controller 518 for processing. The processed data from the MAC controller 518 may be transferred to the Ethernet transceiver 516 for transmission over the first network connection.

Packet data in the received data path of the second Ethernet controller 504 may be received by the Rx CPU 532 for advanced processing. After the Rx CPU 532 has completed advanced processing of the packet data, the Rx CPU 532 may place the processed packet data back in the data path for normal processing and DMA activity between the host 514 and the integrated dual port gigabit Ethernet controller chip 500. In this regard, received data from the second network connection may be received by the Ethernet transceiver or PHY 526 and processed by the MAC controller 528. The processed data may be buffered in at least a portion of the memory 538, from which it may be transferred to the Rx CPU 532 for advanced packet processing. Data received from the second network connection may be received by the Ethernet transceiver or PHY 526 and processed by the MAC controller 528. The processed data may be buffered in at least a portion of the memory 538, from which it may be transferred to the Rx CPU 522 for advanced packet processing. Processing of data received from the first network connection by the first Ethernet controller 502 may be independent of the processing of data received from the second network connection by the second Ethernet controller 504.

Similarly, packet data in the send data path of the second Ethernet controller 504 may be transferred to the Tx CPU 524 for advanced processing. After the Tx CPU 524 has completed advanced processing of the packet data for transmission, the Tx CPU 524 may place the processed packet data back in the data path for normal processing and DMA activity between a host and the integrated dual port gigabit Ethernet controller chip. In this regard, data to be transmitted may be buffered in a portion of the memory 536, from which it may be transferred to the Tx CPU 524 for advanced processing. Data processed by the TX CPU 524 may be buffered in at least a portion of the memory 536 from which it may be transferred to the MAC controller 518 for processing. The processed data from the MAC controller may be transferred to the Ethernet transceiver 516 for transmission over the first network connection. Processing of data received from the first network connection by the first Ethernet controller 502 may be independent of the processing of data received from the second network connection by the second Ethernet controller 504.

In operation the two Ethernet controllers 502, 504 are independently treated and function as two separate ports. For this reason, each of the Ethernet controllers 502, 504 has its own associated register blocks 540, 542 and memories 536, 538 respectively. For illustrative purposes, the first Ethernet controller 502 may be referred to as a first port and the second Ethernet controller 504 may be referred to as a second port. In order to treat these two ports independently and to permit these two ports to share a single bus interface, each port is separately addressable with respect to the bus interface. For illustrative purposes, the bus interface 508 may be regarded as a PCI bus interface. Notwithstanding, to make the ports separately addressable, each port may be assigned a separate and unique function identifier (ID), for example, function zero (0) and function one (1).

In order to access devices through configuration cycles, for example, a combined bus ID and a device ID may be utilized. In his case, however, the combined bus ID and device ID may not suffice to uniquely distinguish the first and the second ports or Ethernet controllers, since the first and the second controllers maintain the same bus ID and device ID. Accordingly, the combined bus ID and device along with the unique PCI function ID may serve to uniquely distinguish the first port and the second port. As a result, each port may be separately identified by using the combined, bus ID, device ID and function ID. In cases where the bus interface is a PCI interface, a PCI bus ID, PCI ID and a PCI function ID may be utilized to address or distinguish each of the ports.

The integrated dual port gigabit Ethernet controller chip utilizes shared memory resources to, for example, reduce cost, pin count and real estate. Since the resources are shared, the arbiter 506 may be configured to arbitrate access to the shared resources. The arbiter may therefore, receive resource access requests, grant access requests, deny access requests and/or arbitrate resource access conflicts. After an access request has been granted or successfully arbitrated for one of the Ethernet controllers 502, 504, the arbiter 506 may acknowledge the access grant or arbitration to the successful Ethernet controller. The arbiter 506 may then facilitate the transfer of information for the successful Ethernet controller to and from the PCI bus interface 508. In accordance with an aspect of the invention, an arbitration algorithm utilized by the arbiter 506 may be static or it may be dynamically configured depending on, for example, operating conditions.

In accordance with an aspect of the invention, the arbiter 506 may be adapted to tag data packets for a particular Ethernet controller function in order to distinguish data packets received from or to be transferred to a particular one of the Ethernet controllers 502, 504. For example, the arbiter 506 may be adapted to add a particular identifier such as unique bit pattern to packets originated from the first Ethernet controller 502. Similarly, the arbiter 506 may be adapted to add a different identifier such as a unique bit pattern to packets originated from the second Ethernet controller 504. In this regard, the arbiter may direct and facilitate transfer of packets from a particular PCI process to a particular PCI function.

Figure 6:
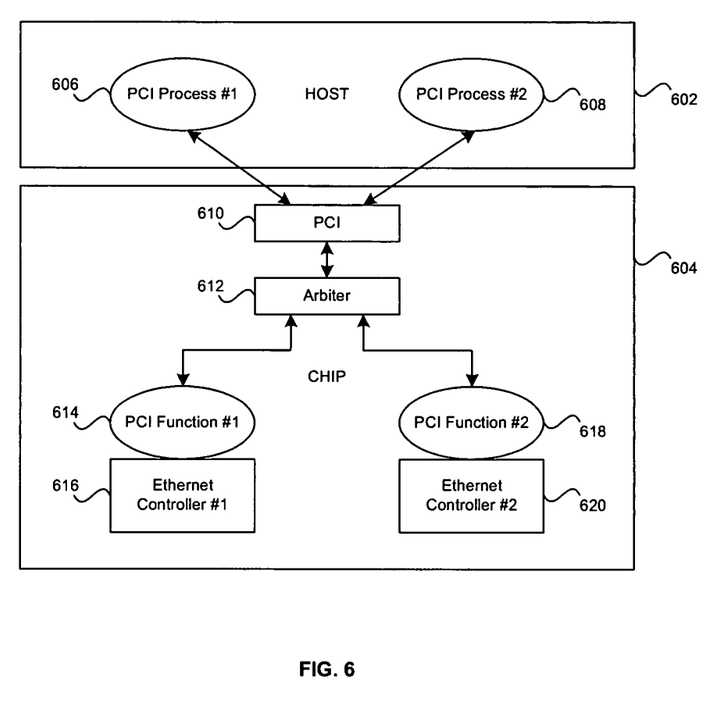
FIG. 6 is a block diagram of an exemplary system for processing network data for a plurality of processes and their corresponding functions in accordance with an embodiment of the invention.

FIG. 6 is a block diagram of an exemplary system for processing network data for a plurality of processes and their corresponding functions in accordance with an embodiment of the invention. Referring to FIG. 6, there is shown a host block 602 and an integrated dual port gigabit Ethernet controller chip block 604. The host block 602 may include a first PCI process 606 and second PCI process 608. The integrated dual port gigabit Ethernet controller chip block 604 may include a PCI block 610, an arbiter block 612, a first PCI function block 614, a first Ethernet controller block 616, a second Ethernet function block 618 and a second Ethernet controller block 620. The first PCI function block 614, the first Ethernet controller block 616 and the first PCI process 606 are corresponding processing entities. The second PCI function block 618, the second Ethernet controller block 620 and the second PCI process 608 are corresponding processing entities. The first PCI function block 614, the first Ethernet controller block 616 and the first PCI process 606 may be adapted to operate independently of the second PCI function block 618, the second Ethernet controller block 620 and the second PCI process 608.

In operation, the first PCI process 606 may be adapted to issue a request to access the first PCI function 614, which handles data for the first Ethernet controller block 616. The request may be routed through PCI bus interface 610 to the arbiter 612 for processing. In a case where the second PCI process 608 issues a simultaneous request to access the second PCI function 618, the arbiter 612 will arbitrate which of the PCI processes 606, 608 will be granted access to the PCI bus interface 610 or any shared resource that may be required to process the request. The arbiter 612 may be configured to send an acknowledgement to the PCI process that wins a successful arbitration. Accordingly, the winning PCI process will be permitted to transfer data to the PCI function, which will be processed by the corresponding Ethernet controller block. For example, if the second PCI process 608 wins a successful arbitration and has received an acknowledgment from the arbiter 612, the PCI process 608 will start transferring data to the second PCI function 618. The transferred data will then be processed by the second Ethernet controller block 620.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein may be suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing network data, the method comprising:
   receiving, by an integrated chip comprising first and second Ethernet controllers, a first request to access said first Ethernet controller from a first host process and a second request to access said first Ethernet controller from a second host process, the first and second host processes running on a host system external to the integrated chip;
   arbitrating, by an arbiter of said integrated chip, which one of said first and second requests is granted access to said first Ethernet controller;
   acknowledging, by said integrated chip, access to one of said first and second host processes based on said arbitrating; and
   after transmitting said acknowledgment, facilitating, by said arbiter, transfer of data between said one of said first and second host processes running on the host system and a network via said first Ethernet controller.

2. The method according to claim 1, comprising:
   receiving, by said first Ethernet controller, first data from said network;
   receiving, by said second Ethernet controller, second data from said network;
   arbitrating which one of said first Ethernet controller and said second Ethernet controller can transfer data to a host process via a bus interface of said integrated chip; and acknowledging a successful arbitration to one of said first Ethernet controller and said second Ethernet controller.

3. The method according to claim 2, comprising:
if said first Ethernet controller receives an acknowledgement of successful arbitration, transferring said first data to said bus interface; and
if said second Ethernet controller receives an acknowledgement of successful arbitration, transferring said second data to said bus interface.

4. The method according to claim 3, comprising:
tagging said first data received from said first Ethernet controller with a first unique identifier; and
tagging said second data received from said second Ethernet controller with a second unique identifier.

5. The method according to claim 1, comprising receiving data from one of said first and second host processes via a bus interface of said integrated chip, said data comprising a combined ID and a unique function ID that identifies one of said first and second Ethernet controllers.

6. The method according to claim 5, comprising determining which one of said first and second Ethernet controllers should receive said data for processing based on said combined and unique function IDs.

7. The method according to claim 6, wherein said determining comprises determining whether said unique function ID comprises a first unique identifier identifying said data to be processed by said first Ethernet controller.

8. The method according to claim 6, wherein said determining comprises determining whether said unique function ID comprises a second unique identifier identifying said data to be processed by said second Ethernet controller.

9. The method according to claim 5, comprising transferring said data from said bus interface to at least one of said first Ethernet controller and said second Ethernet controller.

10. The method according to claim 1, comprising arbitrating which one of said first Ethernet controller and said second Ethernet controller is permitted access to a shared resource of said integrated chip, said shared resource comprising at least one of shared boot code, a shared programming interface, and a semaphore memory access register.

11. A dual port Ethernet controller; comprising:
a bus interface;
a first Ethernet controller coupled to said bus interface;
a second Ethernet controller coupled to said bus interface, said bus interface, said first Ethernet controller, and said second Ethernet controller being integrated within a single chip; and
an arbiter configured to
receive, via said bus interface, a first request to access said first Ethernet controller from a first host process and a second request to access said first Ethernet controller from a second host process, the first and second host processes running on a host system external to the integrated chip,
arbitrate which one of said first and second requests is granted access to said first Ethernet controller, and
acknowledge access to one of said first and second host processes running on the host system based on said arbitrating.

12. The dual port Ethernet controller according to claim 11, wherein said arbiter is coupled to said first Ethernet controller, said second Ethernet controller, and said bus interface.

13. The dual port Ethernet controller according to claim 12, comprising:
a shared resource coupled to at least one of said first Ethernet controller, said second Ethernet controller, and said arbiter, wherein said arbiter is further configured to arbitrate which one of said first Ethernet controller and said second Ethernet controller is permitted access to said shared resource.

14. The dual port Ethernet controller according to claim 13, wherein said shared resource comprises at least one of a non-volatile memory that stores shared boot code, a shared general purpose input/out interface, and a semaphore memory access register.

15. The dual port Ethernet controller according to claim 14, wherein said non-volatile memory comprises at least one of an EEPROM, a Flash memory, a 5 MBus interface and a serial programming interface.

16. The dual port Ethernet controller according to claim 14, wherein said shared general purpose input/output interface comprises at least one general purpose pin.

17. The dual port Ethernet controller according to claim 12, wherein at least one of said first Ethernet controller and said second Ethernet controller comprises:
an Ethernet transceiver;
a MAC controller coupled to said Ethernet transceiver;
a DMA controller coupled to at least one of said MAC controller and said arbiter;
a memory coupled to said MAC controller;
a transmit CPU coupled to at least one of said MAC controller and said memory;
a receive CPU coupled to at least one of said MAC controller and said memory; and
at least one control and status register coupled to at least one of said bus interface, said Ethernet transceiver, said MAC controller, said DMA controller, said memory, said transmit CPU, and said receive CPU.

18. The dual port Ethernet controller according to claim 17, wherein said at least one control and status register comprises:
a bus interface register;
a status register; and
a control register.

19. The dual port Ethernet controller according to claim 17, wherein said at least one control and status register comprises a MII interface register.

20. The dual port Ethernet controller according to claim 11, wherein said bus interface is a PCI interface.

21. The dual port Ethernet controller according to claim 11, comprising at least one of a clock generator and a phase lock loop integrated within said single chip and coupled to at least one of said bus interface, said first Ethernet controller, and said second Ethernet controller.

22. The dual port Ethernet controller according to claim 11, comprising at least one LED interface integrated within said single chip and coupled to at least one of said bus interface, said first Ethernet controller, and said second Ethernet controller.

23. The dual port Ethernet controller according to claim 11, comprising at least one debug interface integrated within said single chip and coupled to at least one of said bus interface, said first Ethernet controller, and said second Ethernet controller.

24. A dual port Ethernet controller comprising:
a bus interface;
a first Ethernet controller coupled to said bus interface;
a second Ethernet controller coupled to said bus interface, said bus interface, said first Ethernet controller, and said second Ethernet controller being integrated within a single chip;
an arbiter configured to
receive, via said bus interface, a first request to access said first Ethernet controller from a first host process and a second request to access said first Ethernet controller from a second host process, arbitrate which one of said first and second requests is granted access to said first Ethernet controller, and acknowledge access to one of said first and second host processes based on said arbitrating; and at least one debug interface integrated within said single chip and coupled to at least one of said bus interface, said first Ethernet controller, and said second Ethernet controller, wherein said at least one debug interface comprises a JTAG interface.

* * * * *